(12) United States Patent
Miyashita (10) Patent No.: US 7,546,203 B2
(45) Date of Patent: Jun. 9, 2009

(54) ROUTE SEARCHING DEVICE

(75) Inventor: Jun Miyashita, Yokohama (JP)

(73) Assignee: Xanavi Informatics Corporation, Zama-shi (JP)

( * ) Notice: Subject to any disclaimer, the term of this patent is extended or adjusted under 35 U.S.C. 154(b) by 810 days.

(21) Appl. No.: 10/470,849

(22) PCT Filed: Jan. 31, 2002

(86) PCT No.: PCT/JP02/00781

§ 371 (c)(1),
(2), (4) Date: Jul. 31, 2003

(87) PCT Pub. No.: WO02/061375

PCT Pub. Date: Aug. 8, 2002

(65) Prior Publication Data

US 2004/0088109 A1    May 6, 2004

(30) Foreign Application Priority Data

Jan. 31, 2001    (JP)    ............ 2001-024003

(51) Int. Cl.
*G01C 21/34*    (2006.01)
(52) U.S. Cl. .............. 701/209; 340/995.2; 342/118
(58) Field of Classification Search .............. 701/200, 701/201, 202, 206, 210, 302, 209; 340/990, 340/995, 988, 995.2, 995.21, 995.23; 73/178 R; 342/118
See application file for complete search history.

(56) References Cited

U.S. PATENT DOCUMENTS

| | | | | |
|---|---|---|---|---|
| 5,365,448 A | * | 11/1994 | Nobe et al. ................ | 701/208 |
| 5,406,490 A | | 4/1995 | Braegas | |
| 5,450,343 A | * | 9/1995 | Yurimoto et al. ............ | 701/208 |
| 5,612,882 A | * | 3/1997 | LeFebvre et al. ............ | 701/209 |
| 5,636,122 A | * | 6/1997 | Shah et al. ................. | 701/207 |
| 5,638,280 A | * | 6/1997 | Nishimura et al. .......... | 701/209 |
| 5,787,383 A | * | 7/1998 | Moroto et al. .............. | 701/210 |
| 5,928,307 A | * | 7/1999 | Oshizawa et al. ........... | 701/210 |
| 5,991,688 A | * | 11/1999 | Fukushima et al. ......... | 701/209 |
| 6,101,443 A | * | 8/2000 | Kato et al. ................. | 701/210 |
| 6,118,389 A | * | 9/2000 | Kamada et al. ........ | 340/995.21 |
| 6,134,501 A | | 10/2000 | Oumi | |

(Continued)

FOREIGN PATENT DOCUMENTS

EP    0 871 010 A2    10/1998

(Continued)

OTHER PUBLICATIONS

European Search Report dated Mar. 23, 2006 (Three(3) pages).

*Primary Examiner*—Tuan C To
(74) *Attorney, Agent, or Firm*—Crowell & Moring LLP (57) ABSTRACT

A route searching apparatus comprises a processing device that searches a guided route along which a vehicle is to be guided from a current vehicle position to a destination and also searches a detour route for detouring a detour segment set over part of the guided route. The processing device extracts guidance-requiring intersections at which the vehicle needs to be guided to follow a course among intersections on the guided route, sets a segment ending at a guidance-requiring intersection close to the current vehicle position among the guidance-requiring intersections as the detour segment, and searches the detour route for detouring the detour segment.

8 Claims, 10 Drawing Sheets

U.S. PATENT DOCUMENTS

| | | | |
|---|---|---|---|
| 6,295,503 B1 * | 9/2001 | Inoue et al. | 701/209 |
| 6,298,304 B1 * | 10/2001 | Theimer | 701/210 |
| 6,339,382 B1 * | 1/2002 | Arbinger et al. | 340/903 |
| 6,401,034 B1 * | 6/2002 | Kaplan et al. | 701/209 |
| 6,456,934 B1 * | 9/2002 | Matsunaga et al. | 701/210 |
| 6,473,693 B1 * | 10/2002 | Kusama | 701/211 |
| 6,751,550 B2 * | 6/2004 | Niitsuma | 701/210 |
| 7,133,771 B1 * | 11/2006 | Nesbitt | 701/202 |

FOREIGN PATENT DOCUMENTS

| | | |
|---|---|---|
| FR | 2 772 498 A1 | 6/1999 |
| JP | 09089580 A * | 4/1997 |
| JP | 9-243394 | 9/1997 |
| JP | 9-318377 | 12/1997 |
| JP | 11325932 A * | 11/1999 |
| JP | 11344349 A * | 12/1999 |
| JP | 2000-193471 | 7/2000 |
| JP | 2001-174278 | 6/2001 |
| WO | WO 99/31638 | 6/1999 |

* cited by examiner

| INTERSECTION TYPE | ELIGIBLE/NON-ELIGIBLE AS GUIDANCE-REQUIRING INTERSECTION |
|---|---|
| INTER-CITY HIGHWAY ENTRANCE | O |
| URBAN HIGHWAY ENTRANCE | O |
| TOLL ROAD ENTRANCE | O |
| BRANCH ON INTER-CITY EXPRESS HIGHWAY MAIN TRACK | O |
| BRANCH ON URBAN EXPRESS HIGHWAY MAIN TRACK | O |
| BRANCH ON TOLL ROAD MAIN TRACK | O |
| INTER-CITY EXPRESS HIGHWAY MAIN TRACK EXIT | O |
| URBAN EXPRESS HIGHWAY MAIN TRACK EXIT | O |
| TOLL ROAD MAIN TRACK EXIT | O |
| PRECEDING BRANCH (INTER-CITY EXPRESS HIGHWAY) | O |
| PRECEDING BRANCH (URBAN EXPRESS HIGHWAY) | O |
| PRECEDING BRANCH (TOLL ROAD) | O |
| SA·PA ENTRANCE | × |
| MERGING POINT WITH REGULAR ROAD | O |
| REGULAR ROAD INTERSECTION | O |
| INTERSECTION OF REGULAR ROAD AND MINOR ROAD | O |
| ROUNDABOUT ENTRANCE | O |
| ROUNDABOUT EXIT | O |
| SA·PA TO BE PASSED | × |
| IC TO BE PASSED | × |
| JCT TO BE PASSED | × |

ROUTE SEARCHING DEVICE

The disclosure of the following priority application is herein incorporated by reference: Japanese Patent Application No. 2001-24003 filed Jan. 31, 2001

TECHNICAL FIELD

The present invention relates to a route searching apparatus that searches the optimal route along which the vehicle is to be guided to the destination, and more specifically, it relates to a route searching apparatus achieved by improving on the method for a detour route search.

BACKGROUND ART

There are route searching apparatuses in the known art that search the optimal route along which the vehicle is to be guided to the destination and search a route for detouring part of the guided route obtained through the search as necessary. In such an apparatus, the detour route search is performed either in an automatic mode, in which the detour route search processing is automatically executed based upon traffic information obtained from an outside source such as a VICS (vehicle information and communication system) or in a manual mode, in which an occupant executes the detour route search processing at any time and at any location. In the automatic mode, traffic information regarding traffic jams, traffic control and construction work in progress and the like is obtained from, for instance, the VICS and a detour route search for detouring a road segment where the traffic is jammed or controlled or construction work is in progress is automatically executed. In the manual mode, the occupant who is aware of a road segment on the guided route where the traffic is jammed or controlled, or construction work is in progress specifies a distance over which the guided route should be detoured starting from the current position by ensuring that the road segment is contained within the specific distance and executes a detour route search in order to detour the guided route over the specified distance. It is to be noted that the detour route search must always be performed in the manual mode in countries and regions where traffic information from the VICS or the like is not available.

In the manual detour route search mode in route searching apparatuses in the related art, the occupant must be aware of the segments over which the guided route should be detoured and execute a detour route search by specifying the distance from the current position which contains the segment to be detoured. Accordingly, it is difficult to correctly specify the distance, which contains the detour segment in a timely manner when the driver wishes to detour the guided route, and there is another problem in that since it is necessary for the occupant to perform the operation of specifying the distance, the operability becomes poor.

DISCLOSURE OF THE INVENTION

The present invention provides a route searching apparatus that improves the degree of convenience and ease with which a detour route search is performed in the manual mode.

A route searching apparatus according to the present invention comprises a processing device that searches a guided route along which a vehicle is to be guided from a current vehicle position to a destination and also searches a detour route for detouring a detour segment set over part of the guided route. The processing device extracts guidance-requiring intersections at which the vehicle needs to be guided to follow a course among intersections on the guided route, sets a segment ending at a guidance-requiring intersection close to the current vehicle position among the guidance-requiring intersections as the detour segment, and searches the detour route for detouring the detour segment.

In this route searching apparatus, it is preferable that the processing device selects an intersection at which a detour starts (hereafter referred to as a detour start. intersection) among intersections present within a predetermined segment close to the current vehicle position on the guided route, sets a segment starting at the detour start intersection and ending at a guidance-requiring intersection closest to the current vehicle position among the guidance-requiring intersections as the detour segment, and searches the detour route for detouring the detour segment.

It is also preferable that the processing device detects types of the guidance-requiring intersections based upon roadmap data, selects a guidance-requiring intersection to be set as an end point of the detour segment among the guidance-requiring intersections close to the current vehicle position according to the intersection types, and searches the detour route for detouring the detour segment ending at the selected guidance-requiring intersection.

It is also preferable that if a distance from the current vehicle position to the guidance-requiring intersection set as an end point of the detour segment is smaller than a predetermined lower limit, the processing device sets a segment extending from the current vehicle position to a point on the guided route distanced from the current position by a predetermined value as the detour segment and searches the. detour route for detouring the detour segment thus set.

It is also preferable that if a distance from the current vehicle position to the guidance-requiring intersection set as an end point of the detour segment exceeds a predetermined upper limit, the processing device sets a segment extending from the current vehicle position to a point on the guided route distanced from the current vehicle position by a predetermined value as the detour segment and searches the detour route for detouring the detour segment thus set.

It is preferable that the processing device does not search the detour route if the detour start intersection is not present within a predetermined distance from the current vehicle position.

It is also preferable that the processing device does not search the detour route if there is no intersection at which the vehicle can return to the guided route between the guidance-requiring intersection set as an end point of the detour segment and the destination.

It is also preferable that the processing device does not search the detour route if an end point of the detour segment is beyond the destination.

A method for executing a route search according to the present invention searches a guided route along which a vehicle is to be guided from a current vehicle position to a destination; extracts guidance-requiring intersections at which the vehicle needs to be guided to follow a course among intersections present on the guided route; and searches a detour route for detouring a detour segment ending at a guidance-requiring intersection close to the current vehicle position among the guidance-requiring intersections.

A computer readable computer program product containing a route search program according to the present invention, the route search program comprises an instruction for searching a guided route along which a vehicle is to be guided from a current vehicle position to a destination; an instruction for extracting guidance-requiring intersections at which the vehicle needs to be guided to follow a course among intersections present on the guided route; and an instruction for searching a detour route for detouring a detour segment ending at a guidance-requiring intersection close to the current vehicle position among the guidance-requiring intersections.

It is preferable that this computer readable computer program product is a recording medium on which the route search program is recorded. The computer readable computer program product may be a carrier wave in which the route search program is embodied as a data signal.

BEST MODE FOR CARRYING OUT THE INVENTION

An explanation is given on an embodiment achieved by adopting the route searching apparatus according to the present invention in, for instance, a navigation system for vehicles. It is to be noted that the route searching apparatus according to the present invention may be adopted in systems other than navigation systems.

Figure 1:
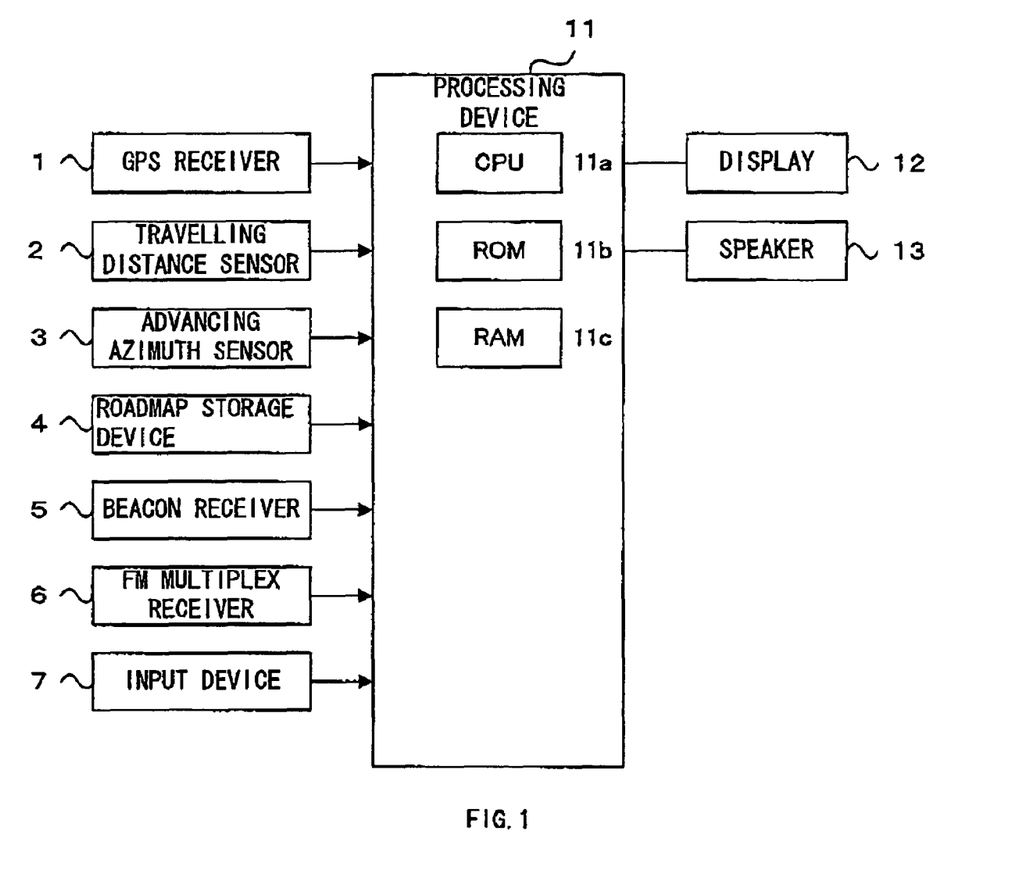
FIG. 1 shows the structure adopted in an embodiment.

FIG. 1 shows the structure assumed in the embodiment. A GPS receiver 1 constantly detects the current position of the vehicle through satellite navigation. A traveling distance sensor 2 detects the distance traveled by the vehicle, and an advancing azimuth sensor 3 detects the advancing azimuth of the vehicle. In addition, a roadmap storage device 4 stores in memory roadmap data. A processing device 11, which is to be detailed later, draws or calculates the locus of the route traveled by the vehicle based upon the traveling distance and the advancing azimuth of the vehicle respectively detected by the traveling distance sensor 2 and the advancing azimuth sensor 3, and detects the current position of the vehicle through map matching achieved by comparing the traveling locus with a roadmap stored in the roadmap storage device 4 in self-contained navigation.

A beacon receiver 5 obtains position information and traffic information by receiving signals from radio beacons and light beacons installed at roads. An FM multiplex receiver 6 obtains traffic information by receiving FM broadcast radio waves. Through an input device 7, which includes operating members such as switches and direction keys, a destination is input and a detour route search mode and the like are set in a menu display. The processing device 11, which includes a CPU 11a, a ROM 11b, a RAM 11c and the like, implements processing for searching a route along which the vehicle is to be guided to the destination, processing for displaying a roadmap, the current position and the guided route at a display 12 and processing for providing route guidance and a warning through a speaker 13. It also implements detour route search processing by executing a control program which is to be explained later.

Now, the method of the detour route search executed in the manual mode in the embodiment is explained. It is to be noted that since the method of the detour route search executed in the automatic mode does not bear any direct relevance to the present invention, its explanation is omitted. The detour route search executed in the manual mode in the embodiment includes a search for a detour route for detouring a segment extending over a specified distance on the guided route and a search for a detour route for detouring the segment leading to the next guidance-requiring intersection on the guided route. For purposes of simplification, the former is referred to as a "specified-distance detour route search" and the latter is referred to as a "guidance-requiring intersection detour route search" in this description.

The "guidance-requiring intersection" mentioned above refers to an intersection at which the vehicle requires course guidance among intersections present on the guided route. For instance, a right angle crossroad at which the vehicle makes a right or left turn constitutes a guidance-requiring intersection but the same right angle crossroad does not constitute a guidance-requiring intersection if the vehicle is advancing straight ahead since the vehicle does not require any guidance in such a case. In addition, a Y-shaped intersection is always a guidance-requiring intersection since the vehicle needs to be provided with guidance as to whether to advance to the left or to the right. Among the guidance-requiring intersections on the guided route, the intersection which is the closest to the current vehicle position is referred to as a "next guidance-requiring intersection". In the following explanation, the symbol P indicates the next guidance-requiring intersection. It is to be noted that the segment extending from a detour start intersection Q to the next guidance-requiring intersection P on the guided route is referred to as a "detour segment", with the detour start intersection Q constituting the start point of the detour segment and the next guidance-requiring intersection P constituting the end point of the detour segment. In addition, the route taken to detour the detour segment on the guided route is referred to as a "detour route".

Figure 2:
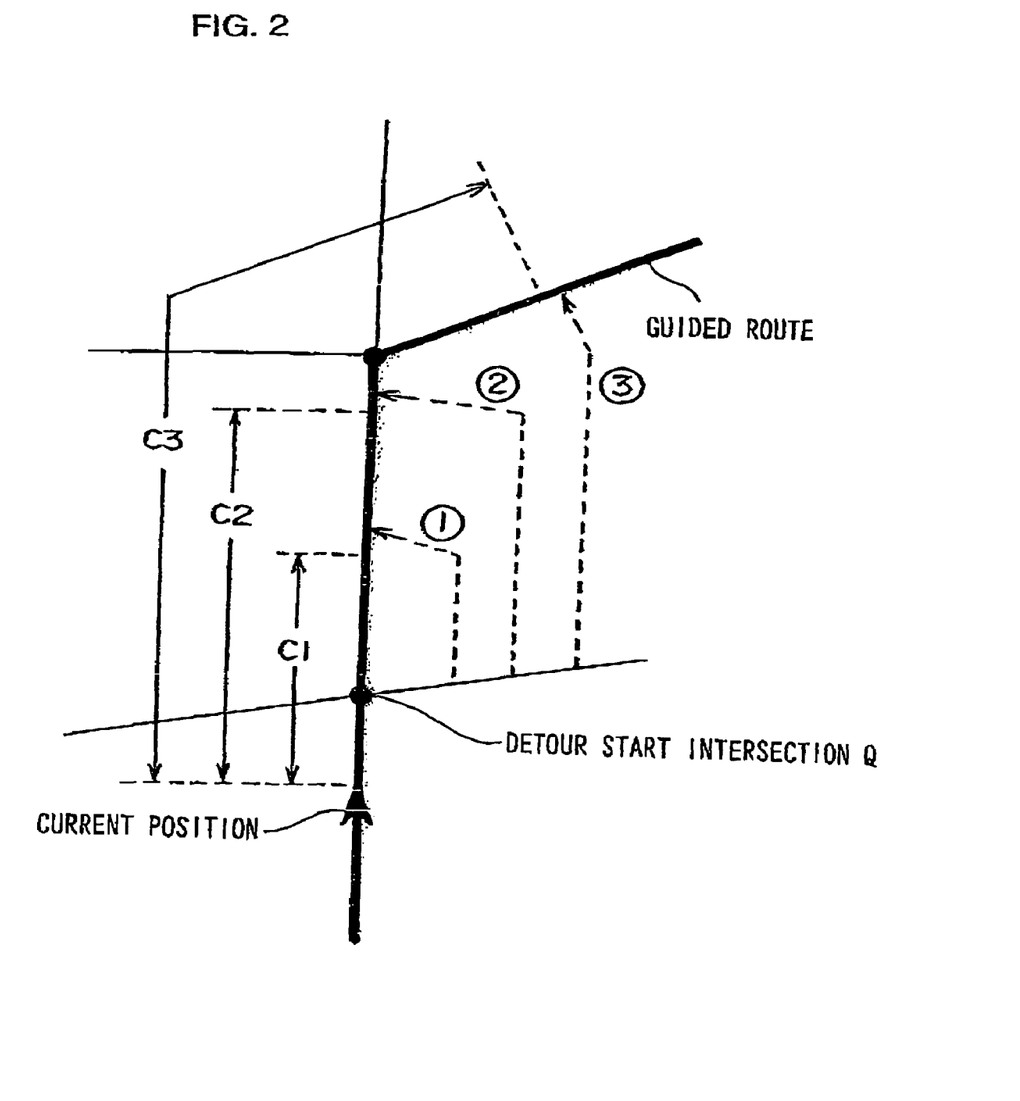
FIG. 2 illustrates a method of a specified-distance detour route search.

First, the method adopted in the specified-distance detour route search is explained in reference to FIG. 2. FIG. 2 shows part of a roadmap brought up on the display 12, with the bold line indicating roads constituting the guided route to the destination and the arrow on the guided route indicating the current position of the vehicle detected through the satellite navigation and the self-contained navigation described earlier. In this embodiment, distances C1, C2 and C3 (C1<C2<C3) from the current vehicle position are set in advance and an occupant is allowed to select one of the distances C1~C3 that contains a segment to be detoured on the guided route due to a traffic jam, traffic control or construction work in progress. Values such as 8 km, 16 km and 32 km may be set for the distances C1, C2 and C3. It is to be noted that the number of distance settings is not limited to three.

In the description, an intersection at which the detour of the guided route starts is referred to as the "detour start intersection" indicated with the symbol Q. The detour start intersection Q is an intersection at which the vehicle is allowed to turn off, present within a segment extending between, for instance, a 300 m point from the current position and the end point of the specified distance (C1~C3) on the guided route. If there are a plurality of intersections at which the vehicle is allowed to turn off within this segment, the intersection which is the closest to the current vehicle position is designated as the detour start intersection Q. It goes without saying that the next guidance-requiring intersection P mentioned earlier is present over a greater distance from the current vehicle position than the detour start intersection Q.

While the conditions imposed when selecting a detour start intersection Q are not limited to those adopted in the embodiment, it is necessary to set the detour start intersection Q over an optimal distance from the current position since if it is set too close to the current position, the vehicle will reach the detour start intersection Q before the detour route search processing is completed and thus, the vehicle cannot be guided along the detour route obtained through the search in time. Accordingly, the segment from which the detouring start intersection Q is selected may be varied in conformance to the vehicle speed. Namely, since the vehicle will reach the segment from which the detour start intersection is selected sooner when it is traveling at higher speed, the distances to the start point and the end point of the segment should be increased as the vehicle speed becomes higher.

In the specified-distance detour route search shown in FIG. 2, a detour route 1 for detouring the segment on the guided route from the current position to the point distanced by C1 is searched if the occupant specifies or selects the distance C1. Likewise, if the occupant selects the distance C2, a detour route 2 for detouring the segment from the current position to the point distanced by C2 is searched, and. if the occupant selects the distance C3, a detour route 3 for detouring the segment from the current position to the point distanced by C3 is searched.

Figure 3:
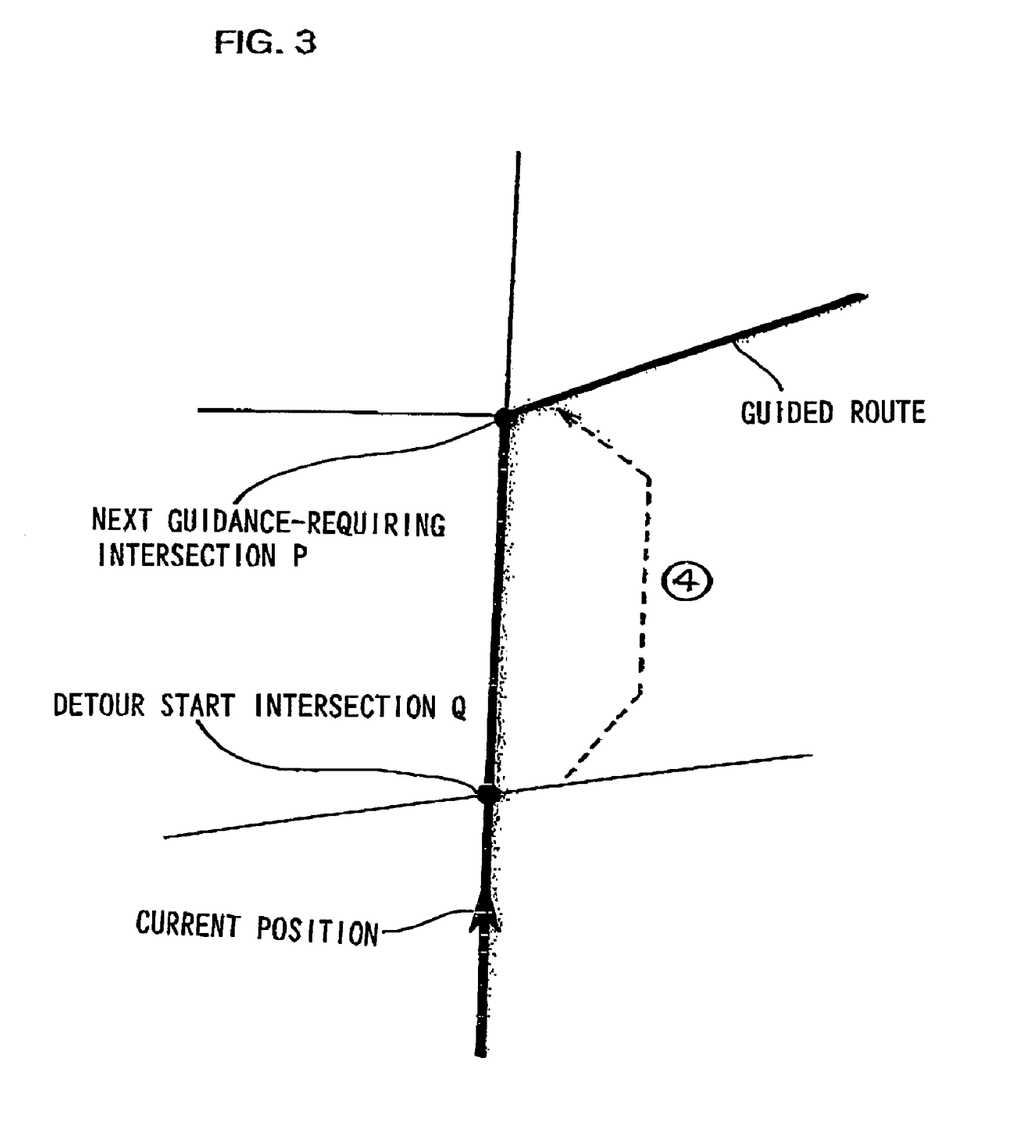
FIG. 3 illustrates a method of a guidance-requiring intersection detour route search.

Next, the method of the guidance-requiring intersection detour route search is explained in reference to FIG. 3. FIG. 3 shows part of the roadmap screen display brought up when the vehicle has been traveling on a guided route similar to that shown in FIG. 2. In this guidance-requiring intersection detour route search, a route for detouring the segment extending from the detour start intersection Q to the next guidance-requiring intersection P on the guided route is searched. In other words, a detour route 4 is searched, on which the vehicle goes off the guided route from the detour start intersection Q and returns to the guided route at an intersection close to the next guidance-requiring intersection P among the intersections present between the next guidance-requiring intersection P and the destination.

Figure 4:
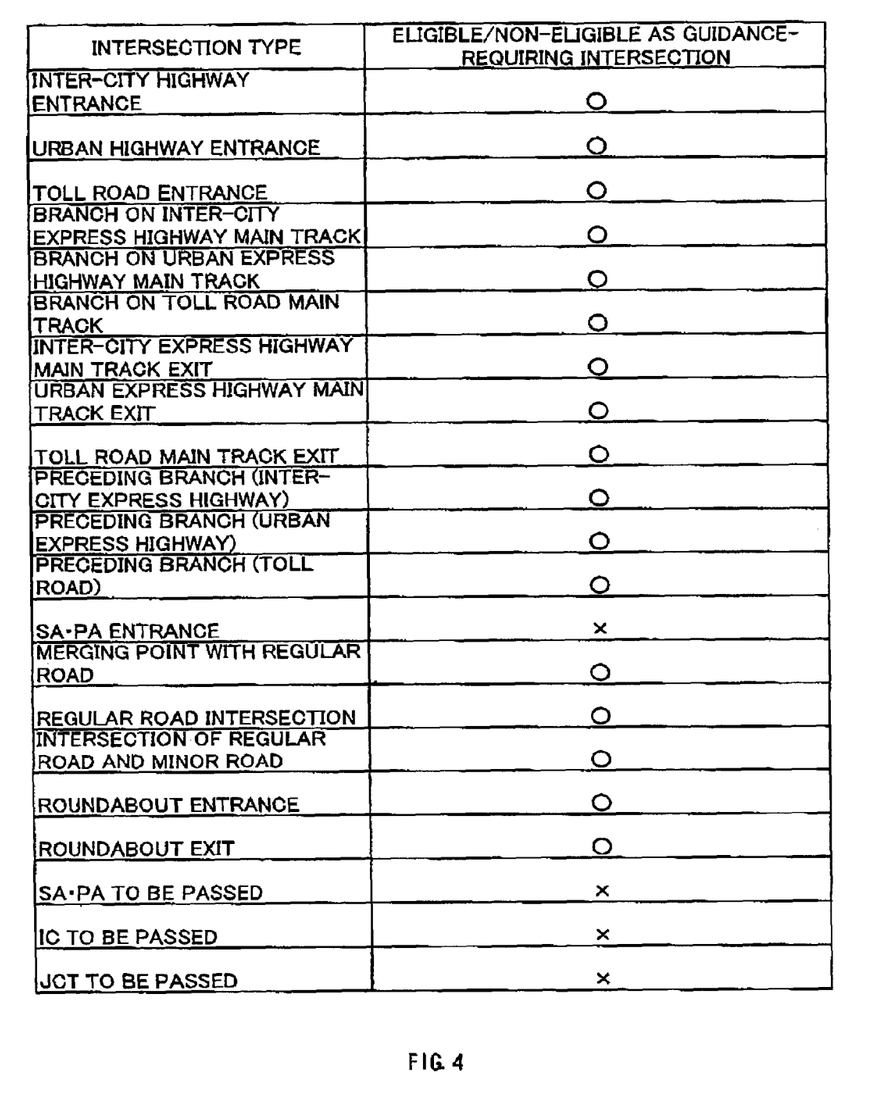
FIG. 4 presents a list of different guidance-requiring intersect ions that may be regarded as next guidance-requiring intersections.

FIG. 4 shows different types of intersections that may be selected as next guidance-requiring intersections in the embodiment. In FIG. 4, the intersections marked with O can each be selected as a next guidance-requiring intersection, whereas the intersections marked with X cannot be set as a next guidance-requiring intersection. In addition, SA indicates a service area, PA indicates a parking area, IC indicates an interchange and JCT indicates a junction in the figure. It is to be noted that in the guidance-requiring intersection detour route search the detour start intersection Q should be selected in a manner similar to the specified-distance detour route search described above, and thus, an intersection at which the vehicle is allowed to turn off, present within a segment between a 300 m point from the current position and the next guidance-requiring intersection P on the guided route should be selected as the detour start intersection Q.

In the specified-distance detour route search described above in which the occupant ascertains a segment to be detoured on the guided route and executes the detour route search by specifying a distance from the current position that contains the segment, the occupant needs to quickly decide the appropriate distance containing the detour segment if he comes upon a traffic jam, a traffic-controlled zone, a construction site or the like while driving on the guided route. However, a traffic jam, a traffic-controlled zone, a construction site or the like that the vehicle may come upon while traveling on a guided route can usually be avoided by detouring the guided route over a segment leading to the next guidance-requiring intersection P closest to the current position among all the guidance-requiring intersections on the guided route. Accordingly, the guidance-requiring intersection detour route search relieves the occupant of the complicated operation for ascertaining the segment to be detoured on the guided route and specifying a distance from the current position containing the segment, thereby making it possible to quickly search an appropriate route for detouring the segment where the traffic is jammed, controlled or where construction is underway with ease.

The search of a detour route to the next guidance-requiring intersection P becomes difficult or disabled if the distance between the current vehicle position and the next guidance-requiring intersection P is too short. On the other hand, setting a great distance between the current vehicle position and the next guidance-requiring intersection P conflicts with the object of the invention, i.e., an easy and quick selection of an appropriate route to be taken to detour a segment where the traffic is jammed or controlled or construction is in progress that the vehicle may come upon while traveling on the guided route.

Figure 5:
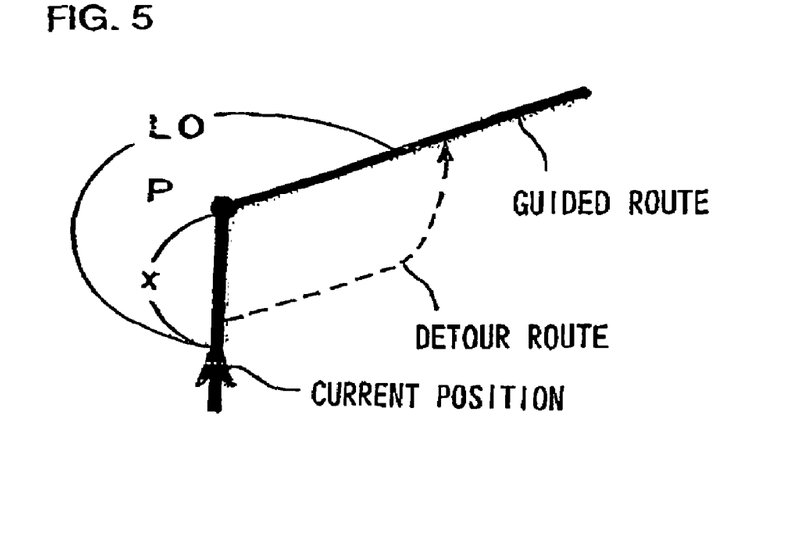
FIG. 5 illustrates a method of a detour route search executed when the next guidance-requiring intersection is close to the current position.

Accordingly, an appropriate method of a detour route search is selected in conformance to the distance x between the current vehicle position and the next guidance-requiring intersection P in the embodiment. A specified-distance detour route search over a predetermined distance D0 is executed instead of a guidance-requiring intersection detour route search if the distance x between the current vehicle position and the next guidance-requiring intersection P is less than a reference lower limit L0 set in advance, as shown in FIG. 5. In the embodiment, the reference lower limit value L0 and the predetermined value D0 are both set to, for instance, 2 km.

Figure 6:
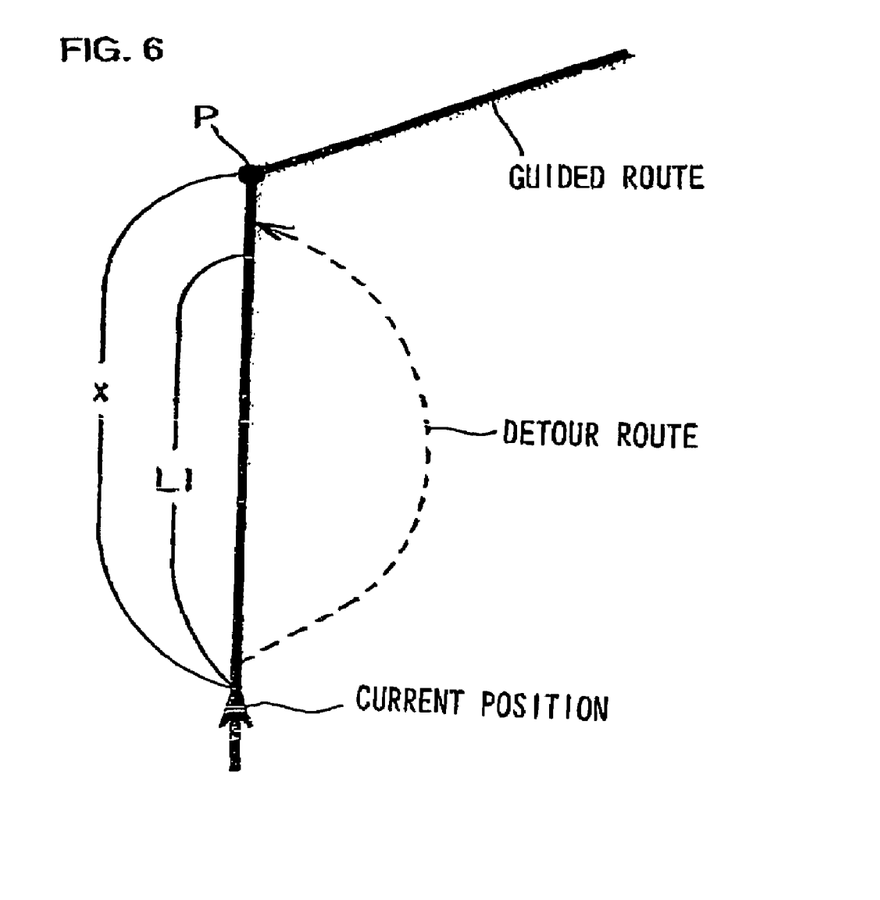
FIG. 6 illustrates a method of a detour route search executed when the next guidance-requiring intersection is far from the current position.
Figure 7:
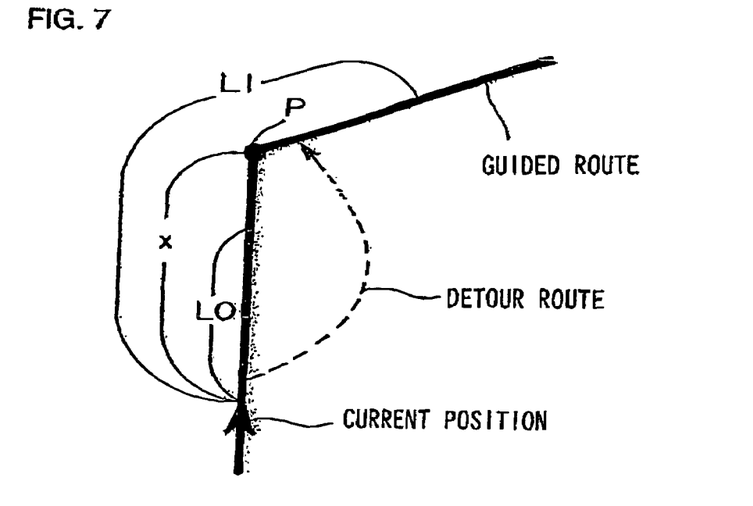
FIG. 7 illustrates a method of a guidance-requiring intersection detour route search executed when the distance from the current position to the next guidance-requiring intersection is within a predetermined range.

In addition, a specified-distance detour route search is executed over a predetermined distance D1 (>D0) without executing a guidance-requiring intersection detour route search if the distance x between the current vehicle position and the next guidance-requiring intersection P exceeds a reference upper limit L1 (>L0) set in advance as shown in FIG. 6. In this embodiment, the reference upper limit value L1 and the predetermined value D1 are both set to, for instance, 5 km. However, if the distance x between the current vehicle position and the next guidance-requiring intersection P is equal to or larger than the reference lower limit L0 and equal to or smaller than the reference upper limit L1 as shown in FIG. 7, the guidance-requiring intersection detour route search is executed.

Figure 8:
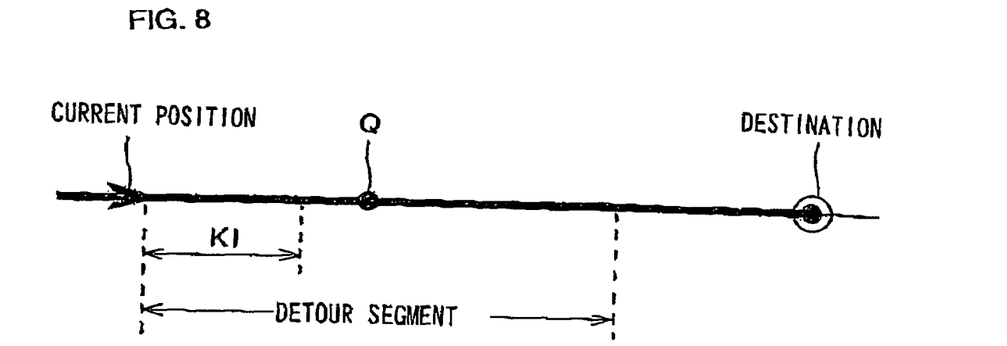
FIG. 8 illustrates the processing executed when the detour start intersection is not within a predetermined distance from the current position.

Even if the occupant issues an instruction for the execution of a specified-distance detour route search or a guidance-requiring intersection detour route search, no detour route search is executed and, instead, a warning is issued in the following situations. Firsts if the detour start intersection Q is not present within a predetermined distance K1 from the current vehicle position, as shown in FIG. 8, a warning indicating that the detour route search is disabled is issued. The predetermined distance K1 should be 100% of the distance specified in the specified-distance detour route search, e.g., 8 km if the specified distance is 8 km (5 miles), 16 km if the specified distance is 16 km and 32 km if the specified distance is 32 km.

Figure 9:
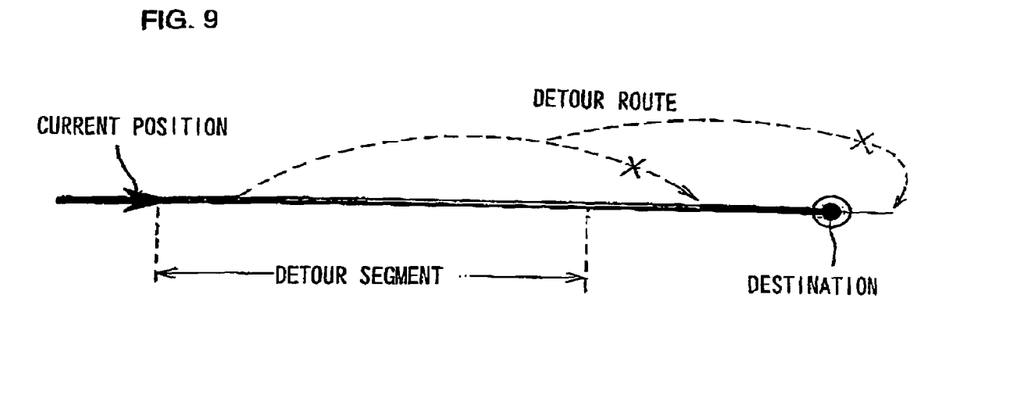
FIG. 9 illustrates the processing executed when there is no intersection from which the vehicle can return to the guided route between the detour segment and the destination.

Also, if there is no intersection which allows the vehicle to return to the guided route present on the guided route between the detour segment and the destination and, at the same time, there. is no route through which the vehicle can travel around to the destination, as shown in FIG. 9, a warning indicating that the detour route search is disabled is issued.

Figure 10:
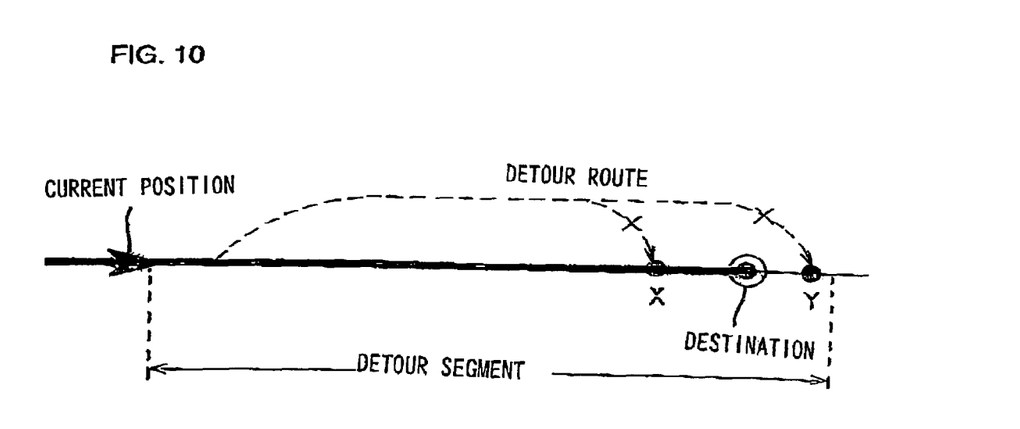
FIG. 10 illustrates the processing executed when the end of the detour segment is beyond the destination.

In addition, if the end point of the detour segment is beyond the destination and, at the same time, there is no route through which the vehicle can reach an intersection present on either side of, namely before or after, the destination, as shown in FIG. 10, a warning indicating that the detour route search is disabled is issued. The detour segment in the detour route search starts at the detour start intersection and ends at the intersection immediately preceding the destination. However, a detour route search may be executed in the following situation even if the specified detoured distance is equal to or greater than the remaining distance between the current position and the destination. Namely, if it is possible to approach the intersection X immediately preceding the destination from a route other than the guided route or if it is possible to approach the intersection Y immediately beyond the destination through a route other than the guided route, as shown in FIG. 10, the route through which the vehicle approaches the intersection X or Y on either side of the destination is searched as a detour route even though the end of the detour segment is beyond the destination.

Figure 11:
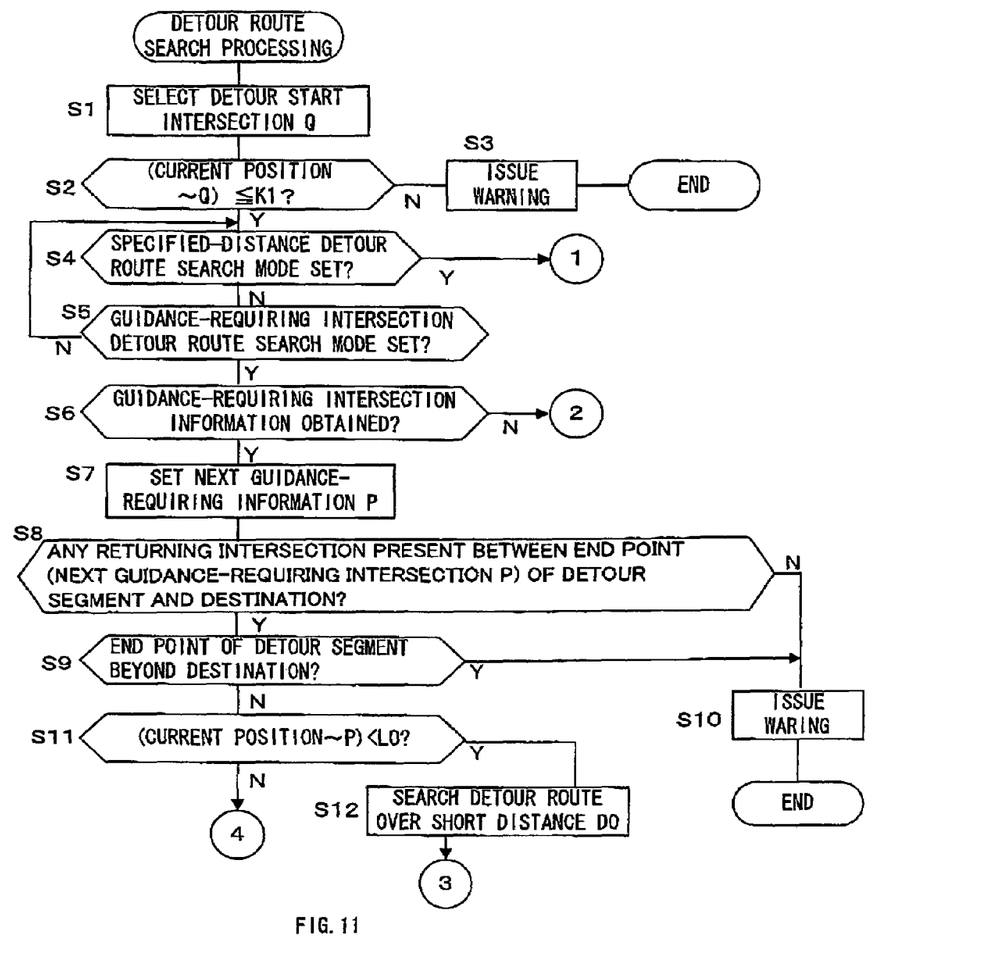
FIG. 11 presents a flowchart of the detour route search processing program executed in the embodiment.
Figure 12:
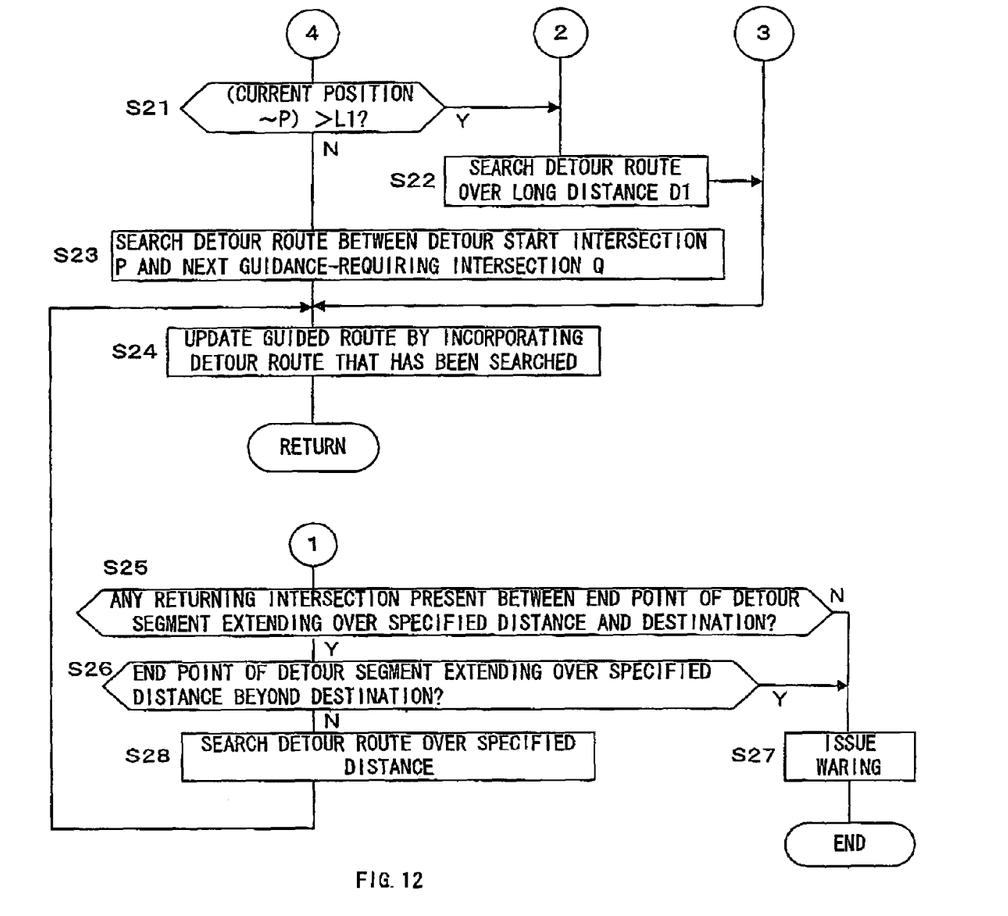
FIG. 12 presents a flowchart of the detour route search processing program executed in the embodiment, continuing from the flowchart in FIG. 11.

FIGS. 11 and 12 present a flowchart of the detour route search program which is stored in the ROM 11b of the processing device 11 and is executed by the CPU 11a. Now, the detour route search processing implemented in the embodiment is explained in reference to the flowchart.

The input device 7 includes a menu switch which is operated to bring up the menu screen on the display 12, and a route search menu item is selected with the direction keys from the menu screen and a detour route search mode is set with the directional keys in the route search menu screen. As explained earlier, the specified-distance detour route search mode or a guidance-requiring intersection detour route search mode can be selected for the detour route search mode. The specified-distance detour route search mode further includes three different specified distance modes, i.e., an 8 km mode, a 16 km mode and a 32 km mode.

When either one of the route search modes is selected, the CPU 11a starts executing the detour route search program shown in FIGS. 11 and 12. In step S1, a detour start intersection Q within a selection segment corresponding to the detour route search mode setting is selected as described earlier. In the following step S2, a verification is made as to whether or not the distance from the current position to the detour start intersection Q is equal to or smaller than the predetermined value K1. If the distance to the selected detoured start intersection Q exceeds K1 and thus, the detour start intersection is far away from the current position, the operation proceeds to step S3 to issue a warning indicating that the detour route search is disabled through the speaker 13 before the processing ends. If, on the other hand, the distance to the detour start intersection Q is equal to or smaller than K1, the operation proceeds to step S4 to make a verification as to whether or not the specified-distance detour route search mode is currently set.

If the specified-distance detour route search mode is not currently set, the operation proceeds to step S5 to make a verification as to whether or not the guidance-requiring intersection detour route search mode is currently set. If the guidance-requiring intersection detour route search mode is currently set, the operation proceeds to step S6 to make a verification as to whether or not guidance-requiring intersection information has been provided through a processing task for searching the guided route to the destination. If the execution of the guided route search processing task is still in progress and, therefore, the guidance-requiring intersection information is not available yet, the operation proceeds to step S22 to execute a specified-distance detour route search over the predetermined long distance D1. However, if the guidance-requiring intersection information has already been provided, the operation proceeds to step S7.

In step S7, a next guidance-requiring intersection P is set as explained earlier. In the following step S8, a verification is made as to whether or not there is an intersection at which the vehicle can return to the guided route between the next guidance-requiring intersection P constituting the end point of the detour segment and the destination. If there is no such returning intersection, the operation proceeds to step S10 to issue a warning before the processing ends. If, on the other hand, there is a returning intersection, the operation proceeds to step S9 to make a verification as to whether or not the next guidance-requiring intersection P at the end of the detour segment is beyond the destination. As explained earlier, if the vehicle can approach the intersection immediately preceding the destination through a route other than the guided route or the vehicle can approach the intersection immediately beyond the destination through a route other than the guided route, the route through which the vehicle is allowed to approach either intersection is searched as the detour route even though the end of the detour segment is beyond the destination. If the end of the detour segment is beyond the destination and, at the same time, there is no detour route available that allows the vehicle to approach an intersection present on either side of the destination, the operation proceeds to step S10 to issue a warning before the processing ends.

In step S11, a verification is made as to whether or not the distance x between the current position and the next guidance-requiring intersection P is less than the reference lower limit L0. The operation proceeds to step S12 if the distance x is less than the reference lower limit L0 to execute a specified-distance detour route search over the predetermined short distance D0 without executing a guidance-requiring intersection detour route search. If, on the other hand, the detour segment distance x is equal to or larger than the reference lower limit L0, the operation proceeds to step S21 to make a verification as to whether or not the distance x over the detour segment extending from the current position to the next guidance-requiring intersection P exceeds the reference upper limit L1. If the detour segment distance x exceeds the reference upper limit L1, the operation proceeds to step S22 to execute a specified-distance detour route search over the predetermined long distance D1. In addition, if the detour segment distance x is equal to or larger than the reference lower limit L0 and equal to or less than the reference upper limit L1, the operation proceeds to step S23 to execute a guidance-requiring intersection detour route search in order to search the route for detouring the detour segment extending from the detour start intersection Q to the next guidance-requiring intersection P.

If the specified-distance detour route search mode is currently set, a verification is made in step S25 as to whether or not there is an intersection at which the vehicle can return to the guided route between the end point of the detour segment extending over the specified distance set to 8 km, 16 km or 32 km and the destination. If there is no returning intersection, the operation proceeds to step S27 to issue a warning before the processing ends. If, on the other hand, there is a returning intersection, the operation proceeds to step S26 to make a verification as to whether or not the end point of the detour segment extending over the specified distance is beyond the destination. As explained earlier, if the vehicle can approach the intersection immediately preceding the destination through a route other than the guided route or the vehicle can approach the intersection immediately beyond the destination through a route other than the guided route, the route through which the vehicle is allowed to approach such an intersection is searched as a detour route even when the end of the detour segment is beyond the destination. If the end of the detour segment is beyond the destination and, at the same time, there is no detour route through which the vehicle can reach an intersection on either side of the destination, the operation proceeds to step S27 to issue a warning before the. processing ends. If the end of the detour segment is not beyond the destination, the operation proceeds to step S28 to execute the specified-distance detour route search over the distance that has been set.

Either of these detour route searches should be executed through Dijkstra's Algorithm or the like by calculating route cost similar to those used in the search of the route to the destination. Once the specified-distance detour route search or the guidance-requiring intersection detour route search is completed, the operation proceeds to step S24 to update the guided route by incorporating the detour route that has been searched and bring up the updated guided route at the display 12 before the operation returns to the route guidance program to continue the route guidance.

The navigation system in the embodiment described above achieves the following advantages.

(1) Guidance-requiring intersections among the intersections present on the guided route are extracted, the segment of the guided route ending at the next guidance-requiring intersection which is the closest to the current vehicle position among the extracted guidance-requiring intersections is set as a detour segment and a detour route for detouring the detour segment is searched. A traffic jam, a traffic control zone or a construction site that the vehicle may come upon while traveling on the guided route can often be avoided by detouring the guided route up to the next guidance-requiring intersection that is the closest to the current vehicle position among the guidance-requiring intersections present on the guided route. Accordingly, a desirable route for detouring a segment where the traffic is jammed or controlled, or construction is in progress can be searched with ease and speed, thereby relieving the driver of a complicated task of ascertaining a segment to be detoured on the guided route and specifying an appropriate distance from the current position that contains the detour segment. As a result, the detour route search executed in the manual mode is greatly facilitated and simplified.

(2) A detour start intersection is selected from intersections present within a predetermined segment on the guided route that is close to the current vehicle position, the segment starting at the detour start intersection and ending at the guidance-requiring intersection that is the closest to the current vehicle position among the guidance-requiring intersections is set as the detour segment and a detour route for detouring this detour segment is searched. In this manner, a shorter detour segment is selected to reduce the length of time required for searching the detour route and, as a result, a suitable detour route can be ascertained quickly, in addition to achieving the advantage described above which corresponds to claim 1.

(3) A type of each guidance-requiring intersection is detected, an appropriate guidance-requiring intersection to be set at the end point of the detour segment is selected from guidance-requiring intersections located close to the current vehicle position in conformance to the intersection type and a detour route for detouring the detour segment ending at the selected guidance-requiring intersection is searched. In this manner, an optimal detour segment and an optimal detour route reflecting the types of intersections present on the road on which the vehicle is currently traveling can be selected, in addition to achieving the advantage described above that corresponds to claim 1.

(4) If the distance between the current vehicle position and the guidance-requiring intersection set as the detour segment end point is smaller than the predetermined lower limit, the segment on the guided route starting at the current position and ending at a point set over a predetermined distance is set as the detour segment and a detour route for detouring the detour segment thus selected is searched. This makes it possible to avoid difficult or unproductive detour route search processing.

(5) If the distance between the current vehicle position and the guidance-requiring intersection set as the detour segment end point exceeds a predetermined upper limit, the segment on the guided route starting at the current position and ending at the point distanced from the current position by a predetermined value is set as the detour segment and a detour route for detouring the detour segment thus selected is searched. As a result, it is possible to avoid a detour route search that is inconsistent with the object of the invention, i.e., to search with ease and speed a desirable detour route for detouring the segment where the vehicle may come upon a traffic jam, a traffic control, construction site or the like on the guided route.

(6) Since a detour route search is not executed if the detour start intersection is not present within a predetermined distance from the current vehicle position, superfluous search processing can be avoided.

(7) Since no detour route search is executed if there is no intersection at which the vehicle can return to the guided route present between the guidance-requiring intersection set as the end point of the detour segment and the destination, superfluous search processing can be avoided.

(8) Since no detour route search is executed if the end of the detour segment is beyond the destination, superfluous search processing can be avoided.

It is to be noted that while an explanation is given in reference to the guidance-requiring intersection detour route search achieved in the embodiment on an example in which a route for detouring the segment starting at the detour start intersection Q and ending at the next guidance-requiring intersection P is searched, the detour segment set in the guidance-requiring intersection detour route search is not limited to the segment between the detour start intersection Q and the next guidance-requiring intersection P. A segment starting at the detour start intersection Q and ending at a guidance-requiring intersection close to the current vehicle position may be selected as the detour segment instead. More specifically, by designating the guidance-requiring intersections closer to the current vehicle position among the guidance-requiring intersections on the guided route; as a first guidance-requiring intersection (corresponds to the next guidance-requiring intersection P mentioned above), a second guidance-requiring intersection, a third guidance-requiring intersection, . . . , in conformance to the order of proximity to the current vehicle position, the detour segment may be set to extend from the guidance start intersection Q to the second guidance-requiring intersection or may be set to extend from the guidance start intersection Q to the following guidance-requiring intersection, i.e., the third guidance-requiring intersection instead.

In addition, a decision may be made as to which intersection among the first guidance-requiring intersection (the next guidance-requiring intersection P), the second guidance-requiring intersection and the third guidance-requiring intersection is to be selected based upon a type of guidance-requiring intersection shown in FIG. 4. Namely, the guidance-requiring intersection to be set as the end point of the detour segment may be selected from the guidance-requiring intersections according to the type of the guidance-requiring intersection. More specifically, when the guidance-requiring intersections are the type of intersections set over large intervals, a guidance-requiring intersection closer to the current vehicle position, e.g., the first guidance-requiring intersection should be selected. On the other hand, when the guidance-requiring intersections are the type of intersections set over small intervals, guidance-requiring intersection further away from the current vehicle position, e.g., the third guidance-requiring intersection, should be selected.

While an explanation is given above in reference to the embodiment on an example in which the present invention is adopted in a navigation system and, more specifically, in a car navigation system, the present invention is not limited to these details. The present invention may instead be adopted in a portable navigation system. In addition, it may be adopted in a mobile phone having a navigation function. In other words, the present invention may be adopted in all types of systems having a navigation function.

Figure 13:
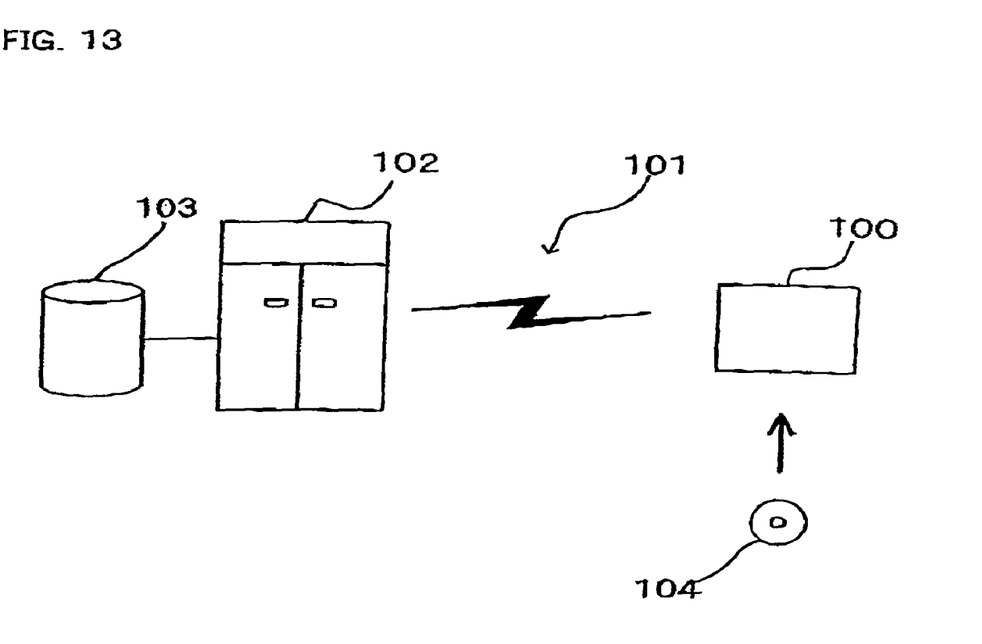
FIG. 13 shows how the program may be provided via a recording medium or the Internet.

While an explanation is given above in reference to the embodiment on an example in which the control program executed by the processing device 11 is stored in the ROM 11*b*, the present invention is not limited to these details. The control program may instead be provided in a recording medium such as a CD-ROM or through data signals on the Internet or the like. FIG. 13 illustrates how this may be achieved. A navigation system 100 is provided with the program via a CD-ROM 104. The navigation system 100 is also capable of connecting with a communication line 101. A computer 102 is a server computer that provides the program stored in a recording medium such as a hard disk 103. The communication line 101 connects the navigation system with the computer, which may be the Internet through, for instance, a mobile telephone network. The computer 102 reads out the program from the hard disk 103 and transmits the program to the navigation system 100 via the communication line 101. Namely, the program is embodied as a data signal on a carrier wave, which is transmitted via the communication line 101.

It is to be noted that a navigation system may be constituted by executing the control program on a personal computer. In such a case, the GPS receiver 1 and the like must be connected to a specific I/O port of the personal computer. The program can be distributed as a computer readable computer program product achieved in any of the various modes including a recording medium and a carrier wave.

The invention claimed is:

1. A route searching apparatus comprising:
a processing device that includes a processor that executes a control program, stored on a computer-readable medium, to search a guided route along which a vehicle is to be guided from a current vehicle position to a destination, set a detour segment to be avoided over part of the guided route, search a detour route that avoids the detour segment, extract guidance-requiring intersections that are intersections at which the vehicle is to be guided to follow a course on the guided route and that exclude intersections at which the vehicle is not to be guided to follow a course on the guided route, and set a segment ending at a guidance-requiring intersection close to the current vehicle position among the guidance-requiring intersections as the detour segment,
wherein when a distance from the current vehicle position to the guidance-requiring intersection set as an end point of the detour segment is smaller than a predetermined lower limit, the processing device executes the control program to set a segment extending from the current vehicle position to a point on the guided route distanced from the current position by a predetermined value as the detour segment and search the detour route that avoids the detour segment thus set.

2. A route searching apparatus according to claim 1, wherein:
the processing device executes the control program to detect individual intersection types to which the guidance-requiring intersections belong based upon roadmap data, select a guidance-requiring intersection to be set as an end point of the detour segment among the guidance-requiring intersections close to the current vehicle position according to the intersection types, and search the detour route that avoids the detour segment ending at the selected guidance-requiring intersection.

3. A route searching apparatus according claim 1, wherein:
the processing device does not search the detour route when there is no intersection at which the vehicle can return to the guided route between the guidance-requiring intersection set as an end point of the detour segment and the destination.

4. A route searching apparatus according to claim 1, wherein:
the processing device does not search the detour route when an end point of the detour segment is beyond the destination.

5. The route searching apparatus of claim 1, wherein the computer-readable medium is one of a read only memory (ROM) and CD-ROM.

6. A route searching apparatus according to claim 1, wherein:
the processing device searches the detour route when an occupant on the vehicle has instructed searching a detour route.

7. A route searching apparatus comprising:
a processing device that includes a processor that executes a control program, stored on a computer-readable medium, to search a guided route along which a vehicle is to be guided from a current vehicle position to a destination, set a detour segment to be avoided over part of the guided route, search a detour route that avoids the detour segment, extract guidance-requiring intersections that are intersections at which the vehicle is to be guided to follow a course on the guided route and that exclude intersections at which the vehicle is not to be guided to follow a course on the guided route, and set a segment ending at a guidance-requiring intersection close to the current vehicle position among the guidance-requiring intersections as the detour segment, wherein when a distance from the current vehicle position to the guidance-requiring intersection set as an end point of the detour segment exceeds a predetermined upper limit, the processing device executes the control program to set a segment extending from the current vehicle position to a point on the guided route distanced from the current vehicle position by a predetermined value as the detour segment and search the detour route that avoids the detour segment thus set.

8. A route searching apparatus comprising:

a processing device that includes a processor that executes a control program, stored on a computer-readable medium, to search a guided route along which a vehicle is to be guided from a current vehicle position to a destination, set a detour segment to be avoided over part of the guided route, search a detour route that avoids the detour segment, extract guidance-requiring intersections that are intersections at which the vehicle is to be guided to follow a course on the guided route and that exclude intersections at which the vehicle is not to be guided to follow a course on the guided route, and set a segment ending at a guidance-requiring intersection close to the current vehicle position among the guidance-requiring intersections as the detour segment, wherein the processing device does not search the detour route when a detour start intersection at which a detour starts is not present within a predetermined distance from the current vehicle position.

* * * * *